A. B. DAVIS.

Car Spring.

No. 1,372.

Reissued Jan. 6. 1863.

Witnesses:

Henry Howson

Chas. E. Foster.

Inventor:

A. B. Davis

AM. PHOTO-LITHO. CO. N.Y. (OSBORNE'S PROCESS)

UNITED STATES PATENT OFFICE.

AUGUSTUS B. DAVIS, OF PHILADELPHIA, PENNSYLVANIA.

IMPROVEMENT IN RAILROAD-CAR SPRINGS.

Specification forming part of Letters Patent No. 22,941, dated February 15, 1859; Reissue No. 1,372, dated January 6, 1863.

DIVISION B.

*To all whom it may concern:*

Be it known that I, AUGUSTUS B. DAVIS, of Philadelphia, Pennsylvania, did obtain Letters Patent of the United States for a "new and useful Improvement in Railroad-Car Springs," which Letters Patent bear date the 15th day of February A. D. 1859; that a description of an improvement was, on the 28th day of June, A. D. 1859, annexed and added to the said Letters Patent, forming part of the same; that I now deem the said Letters Patent, including the addition thereto, inoperative and invalid by reason of defective and insufficient specifications; that I am desirous of obtaining separate reissued patents, one for the invention referred to in the original patent, the other for the improvement referred, in the aforesaid addition to said patent. I therefore declare the following to be a full, clear, and exact description of the improvement set forth in the description annexed to the aforesaid patent, reference being had to the accompanying drawing, and to the letters of reference marked thereon.

My invention relates to an improvement in the railroad-car springs for which I obtained Letters Patent on the 15th day of February, 1859, which patent I have now surrendered for reissue, and my improvement consists of a box of any suitable form, and a plate or its equivalent, adapted to the open end of the said box and connected to the latter by a bolt or bolts or other suitable fastening, in combination with one or more plates separating from each other two or more nests of springs, the whole being constructed substantially as set forth hereinafter, and forming a simple, cheap, and durable railroad-car spring having great elasticity and a more extended movement than that for which the aforesaid patent was granted, as fully described hereinafter.

In order to enable others skilled in the art to make and use my invention, I will now proceed to describe its construction and operation.

Figure 1:
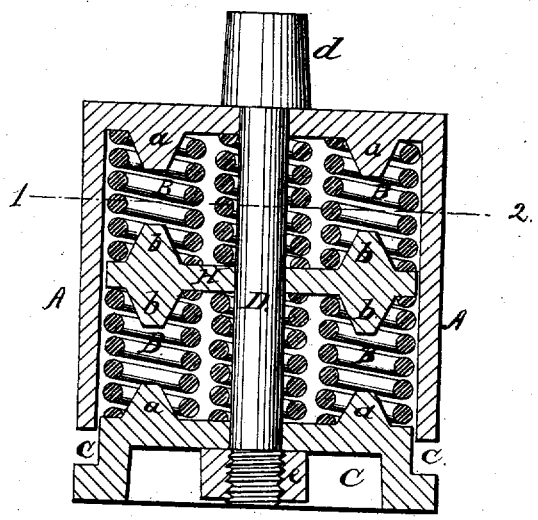
Figure 2:
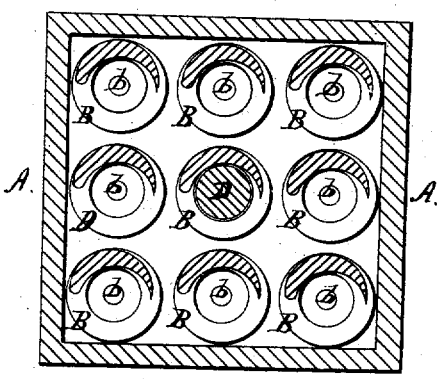

On reference to the accompanying drawings, which form a part of this specification, Figure 1 is a vertical section, and Fig. 2 a sectional plan illustrating my improvement in railroad-car springs.

A is a metal box or casing closed at one end and open at the other, and to the open end of the box a plate, C, is so adapted that a portion of the said plate can move to and fro freely within the said box, the inward movement of the plate being limited by its flange or projection, *c*, coming in contact with the end of the box, and the outward movement being limited by a bolt, D, which passes freely through both box and case, one end of the bolt having a head, *d*, and the other end being provided with a nut, *e*. In the present instance the box contains two layers or nests of spiral or coiled springs, there being nine springs in each nest, and the two nests being separated from each other by a plate, H, which fits snugly, but so as to move freely in the said box. The spiral springs of each nest are arranged side by side, and are maintained free from contact with each other, those of one nest by projections *a a* on the closed end of the box, in conjunction with similar projections, *b*, on one side of the plate H, and those of the other nest by projections *b* on the opposite side of the plate H, in conjunction with projections, *a* on the plate C, as seen in Fig. 1. After the springs with the plate H have been properly adjusted within the box, and the plate C has been applied to the open end of the same, the nut *c* is turned so as to compress the springs sufficiently only to prevent them from becoming loose and being displaced, after which they form with the box and plate C a complete self-contained car-spring.

Prior to the construction of the above-described spring I had made a car-spring consisting of a box, A, with plate, C, adapted to the open end of the box and secured to the same by a bolt, D, in combination with a series or nest of springs arranged side by side and maintained free from contact with each other, each spring of the nest forming an integral part of the entire elastic medium composed of the whole of the springs, and the latter serving, with the said box and plate, as an entire single self-contained car-spring. For this invention Letters Patent of the United States (which I have now surrendered for reissue) were granted to me on the 15th day of February, 1859.

In this spring there was but one nest or layer of spiral or coiled springs, each of which springs was entire from the closed end of the box to the plate C. This plan I found admirably adapted for ordinary car-springs in which no excessive movement was required, and in which the spiral springs might be made comparatively short.

In car-springs requiring an extended movement, and consequently demanding a greater length of spiral springs, the latter, if made longer than six times their diameter, are apt, when compressed, to bend or sag laterally, and consequently to come in contact and interfere with each other, so as to become abraded, thereby frustrating one of the main objects and most important features of my invention. This difficulty is overcome by the above-described improvement, in which, owing to the presence of the plate H, the interior of the box is divided into two compartments, each of which is devoted to one nest of springs, the latter being made short enough to prevent lateral sagging and the entanglement of one spring with the other, and yet sufficiently long to increase the elasticity and permit a greater movement of the entire car-spring, the box being, of course, of an increased depth to accommodate the two nests of springs.

In car-springs requiring a still greater movement two plates H may be used, so that there may be three nests of springs, and still greater movement and elasticity may be obtained by the use of three plates and four nests of springs, and so on.

It will be seen that if one or more of the springs of one or more of the nests become deteriorated and weakened, the other springs still retain their efficiency, and consequently the entire car-spring is weakened to so limited an extent that its services are as available, or nearly so, as if the whole of the springs in the several nests were entire.

The form of the box A as well as that of the plate C may be modified in accordance with the locality in which my improved spring may be placed, and the springs within the box may be made of simple steel, or, what I prefer, common iron wire coiled round a cylindrical rod, or they may be made of square wire or flat steel bars, and may be formed by coiling them round a tapering bar, in which case they would be somewhat similar to those used in cushions, or the springs may be otherwise twisted or bent as the judgment of the constructor may deem most appropriate. I prefer, however, the use of plain spiral or coiled springs, such as are illustrated in the drawings.

Without confining myself, therefore, to any precise form of box or plate C, to any particular fastenings for securing the same to each other, or to any specific number or construction of springs, I claim as my invention and desire to secure by Letters Patent—

A box, A, of any suitable form, and the plate C, or its equivalent, adapted to the open end of the said box and connected to the latter by a bolt or bolts, D, or other suitable fastening, in combination with one or more plates, H, separating from each other two or more nests of springs, the whole being constructed substantially as and for the purpose herein set forth.

In testimony whereof I have signed my name to this specification before two subscribing witnesses.

A. B. DAVIS.

Witnesses:
HENRY HOWSON,
JOHN WHITE.